United States Patent Office 2,992,211
Patented July 11, 1961

2,992,211
TETRAFLUOROBUTADIENE COPOLYMERS
Elizabeth S. Lo, Fords, N.J., and George H. Crawford, Jr., Staten Island, N.Y., assignors, by mesne assignments, to Minnesota Mining and Manufacturing Company, St. Paul, Minn., a corporation of Delaware
No Drawing. Filed Oct. 30, 1956, Ser. No. 619,107
6 Claims. (Cl. 260—87.5)

This invention relates to halogen-containing copolymeric compositions. In one aspect, the invention relates to fluorine-containing copolymeric compositions. More particularly, in this aspect, the invention relates to copolymeric compositions of tetrafluorobutadiene and the method for their manufacture.

It is an object of this invention to provide new and useful fluorine-containing copolymeric compositions having desirable chemical and physical characteristics.

Another object of this invention is to provide new and useful copolymeric compositions of tetrafluorobutadiene which can serve as protective coatings, possessing good chemical and physical characteristics, and which can be readily applied to the surfaces of a wide variety of useful articles.

A still further object of this invention is to provide a process for producing these copolymeric compositions in good yields.

Various other objects and advantages inherent in the invention will become apparent to those skilled in the art from the accompanying description and disclosure.

It has now been found that the copolymerization of tetrafluorobutadiene and fluorine-containing monoolefins, under the conditions more fully hereinafter described, produces copolymeric compositions possessing good chemical and physical stability and good resistance to oils, fuels and various strong chemical reagents. These copolymeric products of tetrafluorobutadiene and the fluorine-containing monoolefin, constitute valuable macromolecules and are adaptable to a wide variety of commercial uses. They possess low-temperature flexibility in addition to the aforementioned properties of good chemical and physical stability and resistance to oil and hydrocarbon fuels. They are selectively soluble in various commercial solvents and serve as durable, flexible, protective coatings on surfaces which are subjected to environmental conditions in which they may come into contact with any of the aforementioned corrosive substances.

As indicated above, the tetrafluorobutadiene is copolymerized with a fluorine-containing monoolefin. Examples of the fluorine-containing monoolefins which can be copolymerized with the tetrafluorobutadiene are trifluorochloroethylene, 1,1-dichloro-2,2-difluoroethylene, trifluoroethylene or vinylidene fluoride.

In general, as more fully hereinafter described, the copolymeric compositions of the present invention are produced from the polymerization of monomeric mixtures containing the tetrafluorobutadiene and the fluorine-containing monoolefin at temperatures between about $-20°$ C. and about $150°$ C. with intermediate temperature ranges being selected with reference to the specific polymerization system employed. The most useful copolymeric compositions are produced from monomeric mixtures containing between about 5 mole percent and about 75 mole percent of the tetrafluorobutadiene and the remaining major constituent being the fluorine-containing monoolefin. The preferred copolymeric compositions of the present invention are copolymers produced from monomeric mixtures containing between about 25 mole percent and about 75 mole percent of the tetrafluorobutadiene and the remaining major constituent being the fluorine-containing monoolefin.

The copolymeric compositions of the present invention are preferably prepared by carrying out the polymerization reaction in the presence of a free radical-forming promoter. For this purpose, the polymerization reaction is carried out by employing a water-soluble peroxy-type initiator in a water-suspension type recipe or an organic peroxide initiator in a bulk-type system. The water-suspension type recipe is preferred.

The water-suspension type system contains a water-soluble peroxy-type initiator, which is preferably present in the form of an inorganic persulfate, such as potassium persulfate, sodium persulfate or ammonium persulfate. In addition, the water-suspension type recipe system may also contain, in some instances, a variable-valence metal salt, for example, an iron salt, such as ferrous sulfate or ferrous nitrate to accelerate the copolymerization reaction. The water-soluble initiator present in the water-suspension type recipe system comprises between about 0.1 and about 5 parts by weight per 100 parts of total monomers present. The variable-valence metal salt is preferably employed in an amount between about 0.01 and about 0.2 part by weight per 100 parts of total monomers present. It is also desirable, in some instances, in these water-suspension type recipe systems, that a reductant be present, preferably in the form of a bisulfite, such as sodium bisulfite, potassium bisulfite, sodium metabisulfite or potassium metabisulfite. The reductant comprises between about 0.05 and about 5 parts by weight per 100 parts of total monomers present; preferably the reductant comprises between about 0.1 and about 2 parts by weight per 100 parts of total monomers present.

In these water-suspension type recipe systems, it is desirable to employ an emulsifying agent. This emulsifying agent is present either in the form of an aliphatic metal acid-salt having from 14 to 20 carbon atoms per molecule, or in the form of a halogenated-organic acid or salts thereof, having from 6 to 18 carbon atoms per molecule. A typical example of the former is potassium stearate. Typical examples of the halogenated-organic acid or salts thereof, serving as emulsifying agents in the above-mentioned water-suspension type recipe systems, are polyfluorocarboxylic acids (e.g., perfluorooctanoic acid) or perfluorochlorocarboxylic acid salts (e.g., trifluorochloroethylene telomer acid soaps). The polyfluorocarboxylic acids which may be employed are such as those disclosed in U.S. Patent No. 2,559,752; and the non-acidic derivatives of the acids disclosed therein as being effective dispersing agents may also be used in the process of the present invention. The perfluorochlorocarboxylic acid salts which may be used in accordance with this invention are those disclosed in co-pending application Serial No. 501,782, filed April 18, 1955, as being useful dispersing agents in polymerization reactions. In general, these emulsifying agents are present in an amount between about 0.5 and about 10 parts by weight per 100 parts of total monomers present.

The polymerization reaction is preferably conducted under neutral conditions, in order to prevent gelling of the resulting polymeric product, a condition which often causes slowdown or stoppage of the polymerization reaction. In this respect, it should be noted that it is sometimes necessary to maintain the pH of the system at a pH of about 7.0 by the addition of suitable buffer agents. Typical examples are sodium borate and disodium phosphate.

As indicated above, the polymerization reaction may also be carried out with the initiator being present in the form of an organic peroxide in a bulk-type polymerization system. Of these organic peroxide promoters, halogen-substituted peroxides are most desirable. A preferred promotor of this type is trichloroacetyl peroxide. Other halogen-substituted organic peroxides for carrying out the polymerization reaction are trifluorodichloropropionyl peroxide, trifluoroacetyl peroxide, difluoroacetyl peroxide, chloroacetyl peroxide, 2,4-dichlorobenzoyl peroxide, dichlorofluoroacetyl peroxide, benzoyl peroxide and ditertiary butyl peroxide.

As previously indicated, the polymerization reaction is carried out, in general, at a temperature between about —20° C. and about 150° C. When the polymerization reaction is carried out employing a water-suspension type recipe, temperatures between about 0° C. and about 100° C. are preferably employed. When the polymerization reaction is carried out in the presence of an organic peroxide initiator in a bulk-type polymerization system, temperatures over the entire range of between about —20° C. and about 150° C. are preferably employed depending upon the decomposition temperature of the promoter. The polymerization reactions described herein to produce the polymeric compositions of the present invention are carried out under autogenous conditions of pressure. These pressures may vary from about atmospheric pressure to as high as 2000 pounds per square inch. However, in general, these pressures do not rise above approximately 500 pounds per square inch.

As previously indicated, the copolymers of the present invention are particularly useful when employed in the form of durable, flexible, protective coatings on surfaces which are subjected to distortion in normal uses, e.g., fabric surfaces. For these purposes, the copolymers of the present invention may be dissolved in various commercial solvents. Particularly useful solvents comprise the aliphatic and aromatic esters, ketones and halogenated hydrocarbons. Typical examples of these solvents are di-isobutyl ketone, methyl ethyl ketone, methyl isobutyl ketone, ethyl acetate and 1,1,2-trifluorotrichloroethane. In this respect, it should be noted that it is often desirable to regulate the molecular weight of the polymeric compositions of the present invention in order to obtain greater solubility in organic solvents. It is found that the addition of various polymerization modifiers appreciably reduces their solubility, without affecting, unduly, the overall yield. Suitable polymerization modifiers include chloroform ($CHCl_3$), Freon-113

$$(CF_2ClCFCl_2)$$

carbon tetrachloride ($CCl_4$), trichloroacetyl chloride $$(CCl_3COCl)$$

bromotrichloromethane ($CBrCl_3$), dodecyl mercaptan ($C_{12}H_{25}SH$) and mixed tertiary mercaptans. These modifiers are preferably added in amounts between about 0.01 and about 10 parts by weight per 100 parts of total monomers charged to the polymerization reaction. Chloroform is preferred.

The following examples are offered for a better understanding in producing the copolymeric compositions of the present invention and are not to be construed as limiting its scope.

*Example I*

A heavy-walled, glass polymerization tube of about 20 ml. capacity is flushed with nitrogen and then charged with 5 cc. of a solution prepared by dissolving 5 grams of potassium stearate in 100 cc. of water. This solution is next adjusted to a pH of 11 by the addition of potassium hydroxide. The contents of the tube are then frozen, and the tube is next charged with 4 cc. of a solution prepared by dissolving 0.75 gram of potassium persulfate in 80 cc. of water. The contents of the tube are next refrozen, and the tube is then charged with 1 cc. of a solution prepared by dissolving 0.4 gram of sodium metabisulfite in 20 cc. of water. The tube and its contents are then refrozen. To the frozen contents of the tube are then added, by distillation, 2.6 grams of 1,1,2,4-tetrafluorobutadiene and 2.4 grams of trifluorochloroethylene, comprising a comonomeric mixture containing 50 mole percent of each monomer.

The polymerization reaction is carried out at a temperature of 50° C. for a period of 70 hours. At the end of this time, the contents of the tube are coagulated by freezing. The coagulated product is then removed from the tube, washed with hot water and then dried to constant weight in vacuo at 35° C. A white, powdery copolymeric product is obtained comprising 82.5 mole percent 1,1,2,4-tetrafluorobutadiene and 17.5 mole percent trifluorochloroethylene, in a good yield.

*Example II*

Employing the procedure set forth in Example I and the same polymerization system, the tube is charged with 2.44 grams of 1,1,2,4-tetrafluorobutadiene and 2.56 grams of 1,1-dichloro-2,2-difluoroethylene, comprising a comonomeric mixture containing 50 mole percent of each monomer.

The polymerization reaction is carried out at a temperature of 50° C. for a period of 70 hours. The resultant product is worked-up in accordance with the same procedure as set forth in Example I. A copolymeric product is obtained in a good yield in a form of a yellowish crumb and, upon analysis, is found to comprise approximately 92.5 mole percent 1,1,2,4-tertafluorobutadiene and the remaining major constituent, 1,1-dichloro-2,2-difluoroethylene, being present in an amount of approximately 7.5 mole percent.

*Example III*

A heavy-walled, glass polymerization tube of about 20 ml. capacity is flushed with nitrogen and then charged with 5 cc. of a solution prepared by dissolving 1 gram of perfluorooctanoic acid in 100 cc. of water. This solution is adjusted to a pH of 10 by the addition of potassium hydroxide. The contents of the tube are then frozen and the tube is next charged with 4 cc. of a solution prepared by dissolving 1 gram of potassium persulfate in 80 cc. of water. The contents of the tube are next refrozen, and the tube is then charged with 1 cc. of a solution prepared by dissolving 0.4 gram of sodium metabisulfite in 20 cc. of water. The contents of the tube are then refrozen. To the frozen contents of the tube are next added, by distillation, 3.32 grams of 1,1,2,4-tetrafluorobutadiene and 1.68 grams of vinylidene fluoride, comprising a comonomeric mixture containing 50 mole percent of each monomer.

The polymerization reaction is carried out at a temperature of 50° C. for a period of 71 hours. The resultant copolymeric product is then worked-up in accordance with the same procedure as set forth in Example I. This product is found, upon analysis, to comprise 1,1,2,4-tetrafluorobutadiene and vinylidene fluoride in a good yield.

*Example IV*

Employing the procedure set forth in Example III and the same polymerization system, the tube is charged with 3.03 grams of 1,1,2,4-tetrafluorobutadiene and 1.97 grams of trifluoroethylene, comprising a comonomeric mixture containing 50 mole percent of each monomer.

The polymerization reaction is carried out at a temperature of 50° C. for a period of 71 hours. The resultant copolymeric product is worked-up in accordance with the same procedure as set forth in Example I. This product is found, upon analysis, to comprise 1,1,2,4-tetrafluorobutadiene and trifluoroethylene in a good yield.

By following the procedures set forth in the above example, other isomers of tetrafluorobutadiene may be copolymerized with each of the aforementioned fluorine-containing monoolefins, under similar conditions of temperature, reaction time, mole ratios and polymerization recipes, to produce the corresponding copolymeric compositions.

As previously indicated, the copolymeric compositions of the present invention may be applied to various surfaces as protective coatings. In such instances, the raw copolymeric composition is dissolved in any of the aforementioned solvents and is applied to the desired surfaces, employing such apparatus as a knife-spreader or a doctor-blade or a reverse-roll coater. The solvent, after the copolymeric coating composition has been applied to the surface, is permitted to evaporate. This may also be accomplished in the presence of elevated temperatures, if so desired. In many applications, it is desirable to include in the copolymeric coating compositions, various vulcanizing agents. In the latter case, supplementary heat treatment of the coating is required, either during the solvent-removal step or thereafter. After the solvent has been completely evaporated, the coated surface is ready for use. In this respect, it should be noted that the polymeric coating composition may be applied to the surface either as a single coating, or if so desired, the protective coating may be built-up by the application of several layers, each layer being permitted to harden by solvent evaporation before the next layer is applied. Furthermore, if so desired, the protective coatings may be suitably pigmented.

Since certain changes may be made in carrying out the process of the present invention in producing the desired copolymeric compositions without departing from the scope of the invention, it is intended that all matter contained in the above description is to be interpreted as illustrative and not in a limiting sense.

We claim:

1. A copolymerization product of 1,1,2,4-tetrafluorobutadiene-1,3 and a fluorinated ethylene selected from the group consisting of trifluorochloroethylene, 1,1-dichloro-2,2-difluoroethylene, trifluoroethylene and vinylidene fluoride, said product containing between about 5 and about 75 mol percent of 1,1,2,4-tetrafluorobutadiene and between about 95 and 25 mol percent of the fluorinated ethylene in copolymerized form.

2. A copolymerization product of 1,1,2,4-tetrafluorobutadiene-1,3 and a fluorinated ethylene selected from the group consisting of trifluorochloroethylene, 1,1-dichloro-2,2-difluoroethylene, trifluoroethylene and vinylidene fluoride, said product containing between about 25 and about 75 mol percent of 1,1,2,4-tetrafluorobutadiene and between about 75 and about 25 mol percent of the fluorinated ethylene in copolymerized form.

3. A copolymerization product of 1,1,2,4-tetrafluorobutadiene-1,3 and trifluorochloroethylene, said product containing between about 25 and about 75 mol percent of 1,1,2,4-tetrafluorobutadiene-1,3 and between about 75 and about 25 mol percent of trifluorochloroethylene in copolymerized form.

4. A copolymerization product of 1,1,2,4-tetrafluorobutadiene-1,3 and vinylidene fluoride, said product containing between about 25 and about 75 mol percent of 1,1,2,4-tetrabutadiene-1,3 and between about 75 and about 25 mol percent of vinylidene fluoride in copolymerized form.

5. A copolymerization product of 1,1,2,4-tetrafluorobutadiene-1,3 and 1,1-dichloro-2,2-difluoroethylene, said product containing between about 25 and about 75 mol percent of 1,1,2,4-tetrafluorobutadiene-1,3 and between about 75 and about 25 mol percent of 1,1-dichloro-2,2-difluoroethylene in copolymerized form.

6. A copolymerization product of 1,1,2,4-tetrafluorobutadiene-1,3 and trifluoroethylene, said product containing between about 25 and about 75 mol percent of 1,1,2,4-tetrafluorobutadiene-1,3 and between about 75 and about 25 mol percent of trifluoroethylene in copolymerized form.

References Cited in the file of this patent

UNITED STATES PATENTS

| | | |
|---|---|---|
| 2,479,367 | Joyce et al. | Aug. 16, 1949 |
| 2,668,182 | Miller | Feb. 2, 1954 |
| 2,742,454 | Rearick et al. | Apr. 17, 1956 |
| 2,743,303 | Anderson | Apr. 24, 1956 |
| 2,750,431 | Tarrant | June 12, 1956 |
| 2,783,219 | Passino et al. | Feb. 26, 1957 |
| 2,837,505 | Dittman et al. | June 3, 1958 |
| 2,842,528 | Herbst et al. | July 8, 1958 |

OTHER REFERENCES

Tarrant et al.: J.A.C.S. 77, p. 3640–2 (1955).